United States Patent [19]

Rendek

[11] Patent Number: 4,691,568

[45] Date of Patent: Sep. 8, 1987

[54] SEMI-CONDUCTOR ACCELEROMETER

[75] Inventor: Peter M. Rendek, Chandler, Ariz.

[73] Assignee: Motorola, Inc., Schaumburg, Ill.

[21] Appl. No.: 806,919

[22] Filed: Dec. 9, 1985

[51] Int. Cl.$^4$ ............................................... G01P 15/12
[52] U.S. Cl. ..................................... 73/517 R; 338/5; 338/43
[58] Field of Search ...................... 73/517 R, 862.63; 338/2, 5, 43, 46, 47

[56] References Cited

U.S. PATENT DOCUMENTS

| | | | |
|---|---|---|---|
| 3,272,006 | 9/1966 | Eckard | 73/862.63 |
| 4,116,075 | 9/1978 | Ort | 338/4 |
| 4,129,042 | 12/1978 | Rosvold | 338/2 |
| 4,411,158 | 10/1983 | Schaff, Jr. | 338/4 |
| 4,430,895 | 2/1984 | Colton | 73/517 R |

Primary Examiner—John Chapman
Attorney, Agent, or Firm—Maurice J. Jones, Jr.; Eugene A. Parsons

[57] ABSTRACT

A square diaphragm formed of monocrystalline silicon and integrally attached to a silicon frame surrounding the diaphragm at its four edges. A serpentine resistor is diffused into the surface of the diaphragm adjacent each of the edges and the resistors are connected in a Wheatstone bridge configuration. The frame of the diaphragm is anodically bonded to a pyrex base member so that all four edges of the diaphragm are fixed relative to the base member and each other. The volume between the base member and the diaphragm is vented to prevent any differential pressure from occurring on the diaphragm.

10 Claims, 6 Drawing Figures

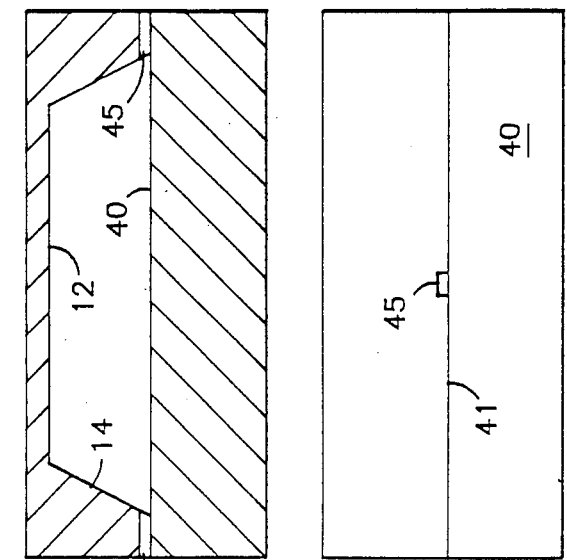
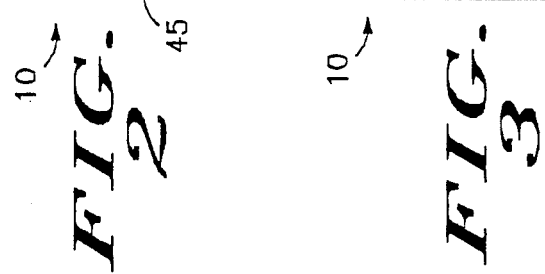
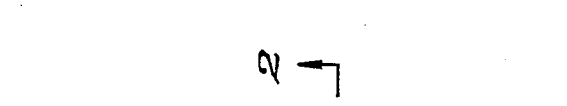
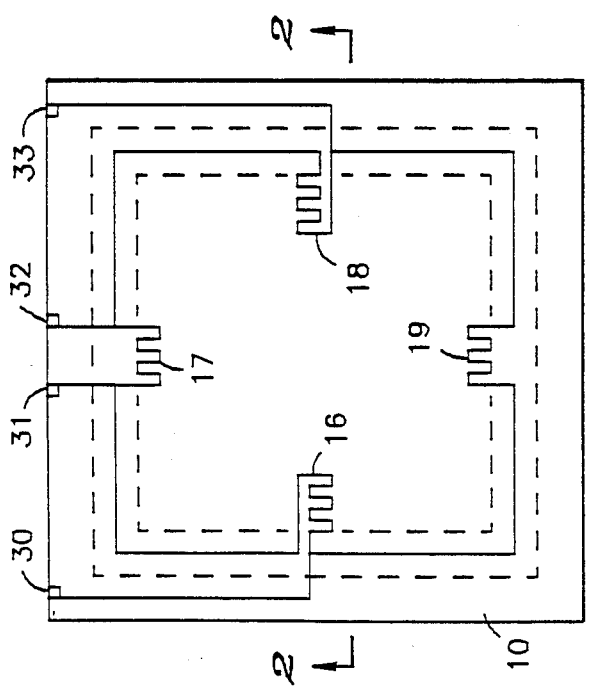
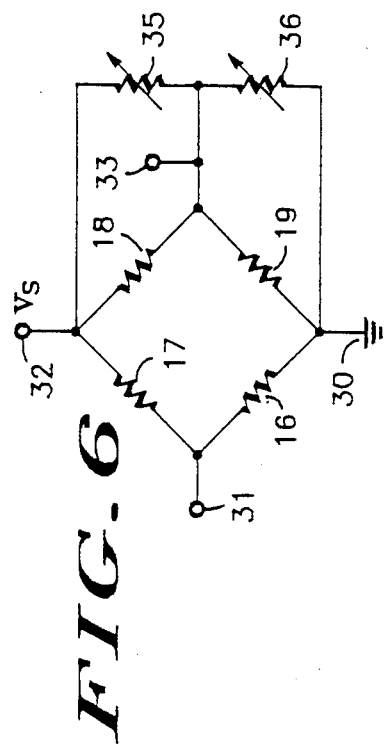
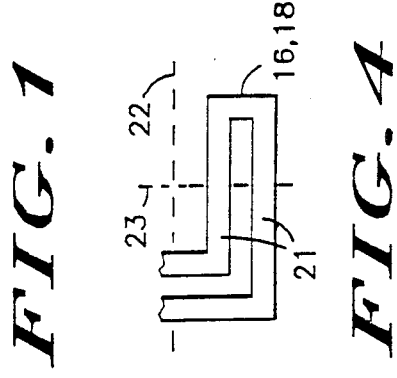

4,691,568

SEMI-CONDUCTOR ACCELEROMETER

BACKGROUND OF THE INVENTION

The present invention pertains to a semiconductor accelerometer and more particularly to a semiconductor accelerometer capable of withstanding extremely high G forces. A wide variety of semiconductor pressure sensors have been disclosed wherein a diaphragm is situated over a recess formed in a semiconductor chip and the recess is closed, for example by mounting the chip on a base member, so that a pressure differential occurs on opposite major faces of the diaphragm. The pressure differential causes the diaphragm to flex, which alters the resistance of various resistances formed in the diaphragm. Some electrical connection is made to the resistances to sense the change in resistance and, hence, the differential pressure of the diaphragm. In some instances, these prior art devices have hinted at sensing acceleration or other forces. However, because of the sensitivity of the device to pressure, any changes in pressures will react similar to a force or acceleration and will produce an offset in the device and, consequently, an error in any force or acceleration measurements.

Also, these prior art devices are not mounted to prevent flexure of the entire chip in which the pressure sensor is formed. Any flexing or bending of the entire chip will again produce an offset in the sensors formed on the diaphragm, which will in turn produce errors in the force or acceleration readings. Because of these problems, none of the prior art pressure sensors can be used to measure acceleration, and especially high G acceleration.

SUMMARY OF THE INVENTION

The present invention pertains to an accelerometer including a substantially square diaphragm formed of monocrystalline silicone with four edges defined by a relatively thick frame member integrally affixed thereto, a serpentine resistor diffused into the diaphragm adjacent each edge and centered approximately on a bisector of the edge and electrically connected into a Wheatstone bridge configuration, a base member having a relatively flat surface with the frame member positioned on the flat surface so that the diaphragm is parallel to the flat surface and spaced therefrom and the frame member fixedly anchors each edge of said diaphragm to said base member to prevent relative movement thereof, and a vent for the volume between the diaphragm and the base member formed in one of the frame member and the base member to prevent the occurrence of differential pressure on the opposed major surfaces of the diaphragm.

It is an object of the present invention to provide a new and improved semiconductor accelerometer.

It is a further object of the present invention to provide a new and improved semiconductor accelerometer constructed to eliminate DC offsets even under relatively high G forces.

It is a further object of the present invention to provide a new and improved semiconductor accelerometer which is relatively simple and efficient to manufacture. These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in top plan of a monocrystalline silicon chip having an accelerometer formed therein which embodies the present invention;

FIG. 2 is a cross sectional view as seen from the line 2—2 in FIG. 1; FIG. 3 is a view in end elevation as seen from the righthand side of FIG. 1;

FIG. 4 is an enlarged view in top plan of a first type of diffused resistor used in FIG. 1;

FIG. 5 is an enlarged view in top plan of a second type of diffused resistor used in FIG. 1; and FIG. 6 is a schematic view of the diffused resistors in FIG. 1 and further electrical circuitry connected thereto.

DESCRIPTION OF THE PREFERRED EMBODIMENT

Referring specifically to FIGS. 1-3 a semiconductor accelerometer embodying the present invention is illustrated. A chip 10 of monocrystalline silicon is illustrated here in a square configuration and relatively thick. The chip 10 is etched in the central area from the bottom to form a thin diaphragm 12 with a relatively thick frame member 14 integrally affixed thereto along all four edges of the diaphragm 12. There are a large number of methods for etching monocrystalline silicon which are well known to those skilled in the semiconductor are and, accordingly, any specific method of etching the chip will not be described herein. While a timed etch generally limits the minimum dependable thickness of diaphragm 12 to approximately 0.8 mils, other methods, such as the growing of epitaxial layers, can be utilized to form dependable thinner diaphragms.

It is preferred that the diaphragm 12 be formed with a generally square configuration and it should be understood that the length of the sides and the thickness of diaphragm 12 will depend upon the specific applications for which the accelerometer is to be utilized. In general, the dimensions should be such as to provide a natural frequency which is well above any frequencies that may occur in the ordinary usage thereof, since an acceleration occurring at the natural frequency, will give false readings and could destroy the entire device. For measuring relatively high G accelerations it has been found that natural frequencies near, or in excess of 100,000 cycles is preferred. The variation in natural frequency for changes in the length of the sides and the thickness of diaphragm 12 are listed in Table 1 below.

TABLE 1

| Side Length (in.) | PREDICTED NATURAL FREQUENCY SQUARE DIAPHRAGM | | | | |
|---|---|---|---|---|---|
| | THICKNESS (in.) | | | | |
| | 0.0008 | 0.0009 | 0.0010 | 0.0011 | 0.00120 |
| 0.046 | 232249.53 | 261280.72 | 290311.91 | 319343.10 | 348374.29 |
| 0.048 | 213298.61 | 239960.94 | 266623.26 | 293285.59 | 319947.92 |
| 0.050 | 196576.00 | 221148.00 | 245720.00 | 270292.00 | 294864.00 |
| 0.052 | 181745.56 | 204463.76 | 227181.95 | 249900.15 | 272618.34 |
| 0.054 | 168532.24 | 189598.77 | 210665.29 | 231731.82 | 252798.35 |
| 0.056 | 156709.18 | 176297.83 | 195886.48 | 215475.13 | 235063.78 |
| 0.058 | 146087.99 | 164348.99 | 182609.99 | 200870.99 | 219131.99 |
| 0.060 | 136511.11 | 153575.00 | 170638.89 | 187702.78 | 204766.67 |
| 0.062 | 127845.99 | 143826.74 | 159807.49 | 175788.24 | 191768.99 |
| 0.064 | 119980.47 | 134978.03 | 149975.59 | 164973.14 | 179970.70 |
| 0.066 | 112891.10 | 126921.49 | 141023.88 | 155126.26 | 169228.65 |
| 0.068 | 106280.28 | 119565.31 | 132850.35 | 146135.38 | 159410.42 |

TABLE 1-continued
PREDICTED NATURAL FREQUENCY SQUARE DIAPHRAGM

| Side Length (in.) | THICKNESS (in.) | | | | |
|---|---|---|---|---|---|
| | 0.0008 | 0.0009 | 0.0010 | 0.0011 | 0.00120 |
| 0.070 | 100293.88 | 112830.61 | 125367.35 | 137904.08 | 150440.82 |
| 0.072 | 94799.38 | 106649.31 | 118499.23 | 130349.15 | 142199.07 |
| 0.074 | 89744.34 | 100962.38 | 112180.42 | 123398.47 | 134616.51 |
| 0.076 | 85083.10 | 95718.49 | 106353.88 | 116989.27 | 127624.65 |
| 0.078 | 80775.81 | 90872.78 | 100969.76 | 111066.73 | 121163.71 |

Four serpentine resistors 16 through 19, illustrated schematically in FIG. 1, are diffused into diaphragm 12 by any of the well known semiconductor techniques. Resistors 16 and 18 are diffused into diaphragm 12 adjacent and parallel to opposite edges while resistors 17 and 19 are diffused into diaphragm 12 adjacent and orthogonal to the two remaining edges. An enlarged detail view of a resistor of the type used for resistors 16 and 18 is illustrated in FIG. 4 and an enlarged detailed view of a resistor used for resistors 17 and 19 is illustrated in FIG. 5. The resistor illustrated in FIG. 4 includes a pair of resistive legs 21 situated generally parallel with and adjacent to the edge of diaphragm 12, which edge is represented by dashed line 22 in FIG. 4. Also, the legs 21 are approximately equally spaced on either side of a dotted line 23, which represents the center or bisector of edge 22.

The resistor illustrated in FIG. 5 has four resistive legs 25, which legs are positioned generally perpendicular to and adjacent the edge of diaphragm 12, represented by dashed line 26 in FIG. 5. Also, two of the legs 25 are situated on either side of dotted line 27, which represents the center or bisector of edge 26. It should be noted that the total area in legs 21 of the resistor in FIG. 4 and legs 25 of the resistor in FIG. 5 are approximately the same so that the resistors are of equal size but oriented orthogonally with respect to their respective edges of diaphragm 12. While the embodiment illustrated and described is preferred, it is believed that like pairs of resistors need not be situated on opposite sides to achieve the desired result.

When diaphragm 12 flexes due to an acceleration of chip 10, the greatest strain in diaphragm 12 occurs along each edge thereof and more specifically at the bisector of each edge. Thus, by situating resistors 16 through 19 adjacent the edges of diaphragm 12 the maximum strain and, thus, the maximum change of resistance will occur. Further, because adjacent resistors are oriented orthogonally with respect to their associated diaphragm edges, the change of resistance will be in opposite directions, i.e. as the resistance of resistors 16 and 18 increases, the resistance of resistors 17 and 19 will decrease and vice versa. Thus, by connecting resistors 16 through 19 into a Wheatstone bridge configuration (see FIG. 6) the opposite changes in the resistors greatly enhances the sensitivity.

In FIG. 1 four connecting pads 30 through 33 are formed along one edge of chip 10 to provide external connections to the accelerometer. Pad 30 is connected to one side of resistor 16 and one side of resistor 19. Pad 31 is connected to the other side of resistor 16 and one side of resistor 17. Pad 32 is connected to the other side of resistor 17 and one side of resistor 18. Pad 33 is connected to the other side of resistor 18 and the other side of resistor 19. Referring to FIG. 6, it will be seen that pad 30 is connected to ground and pad 32 is adapted to have a supply voltage attached thereto. Terminals 31 and 33 then provide an output. Also, in FIG. 6 a first variable resistor 35 is connected in parallel with resistor 18 and a second variable resistor 36 is connected in parallel with resistor 19. Resistors 35 and 36 may be, for example, laser trimmable thin film resistors which are formed on chip 10 along with the accelerometer or they may be formed on an adjacent chip containing other circuitry adapted to receive the accelerometer output. It should be understood that variable resistors 35 and 36 could be any type of variable resistor which may be utilized to compensate for variations in resistors 16 through 19, in which variations occur during manufacture. Thus, resistors 35 and 36 are utilized to balance the Wheatstone bridge and produce a null or zero output between terminals 31 and 33 with no acceleration of the bridge.

In this preferred embodiment, the chip 10 is formed on a monocrystal silicon <100> wafer which defines the crystalographic orientation. Further, the resistors 16 through 19 are oriented on the chip 10 in the 110 direction to provide the greatest sensitivity. The change in resistance in resistors 16 through 19 with acceleration, or stress on the crystal structure, is a product of the piezo-resistivity characteristic, which is in turn determined by the size of chip 10. As the thickness of diaphragm 12 decreases, the amount of flexural movement increases for a given force and, thus, the sensitivity increases. An accelerometer with a sensitivity of 2 microvolts per G can be obtained with a side length of 65 mils, a diaphragm thickness of 1 mil, 20,000 ohm resistors, and 5 volts excitation.

In addition to effecting the natural frequency and the sensitivity of the accelerometer, the size of chip 10 is important from a manufacturing standpoint, i.e. as the size of chip 10 and the components thereon increases the ease and accuracy of manufacturing the chip increases. Further, as the area of diaphragm 12 increases the amount of acceleration, or shock, it will withstand decreases radically. Thus, there is a trade off between natural frequency and ruggedness versus sensitivity and ease and accuracy of manufacture. While the specific application of the accelerometer will dictate the size to be used, in general for high G accelerometers the length of the edges of diaphragm 12 will lie in a range of approximately 55 mils to 75 mils and the thickness of diaphragm 12 will lie in a range of approximately 0.8 mils to 1.2 mils. Further, it has been found that an N type silicon crystal is preferred with resistors 16 through 19 being formed, for example, by P type doping.

To complete the accelerometer a base member 40 having at least one flat surface 41 is provided. Base member 40 is a large rugged block which is formed, in this preferred embodiment, of 7,700 series pyrex glass. A groove 45 is formed in the bottom of frame member 14 (as shown in FIGS. 2 and 3) or in the flat surface 41 of mounting member 40 to provide a vent for pressure. Frame member 14 is then placed in overlying relationship to surface 41 of mounting member 40 and the two members are fixedly bonded together by some means, preferably by anodic bonding. The large rugged block bonded to frame member 14 prevents any relative movement of frame member 14. For example, if frame member 14 were not fixedly attached to base member 40, under high acceleration forces the entire structure could bend about a central axis, rather than restricting diaphragm 12 to a flexing action. Such a bending motion would produce an erroneous reading from the accelerometer. Further, without base member 40, or with improper bonding techniques, frame member 14 could be mounted so as to produce a bending stress in the entire structure, which would produce a DC offset in the accelerometer and result in erroneous readings. It has been found, for example, that no DC offset is created when frame member 14 is bonded to base member 40 by anodic bonding. However, some DC offset has been produced when the bonding is accomplished with glues and the like.

The venting opening 45 in the assembled structure, which may be milled with a saw after etching diaphragm 12 or, if formed in surface 41 of base member 40 may be milled prior to bonding, is important to prevent the occurrence of a differential pressure on the opposed major surfaces of diaphragm 12. If the large volume between diaphragm 12 and base member 40 were not vented any changes in external pressure would cause a flexing of diaphragm 12 and erroneous readings.

Thus, an improved semiconductor accelerometer is disclosed which is capable of measuring relatively high G acceleration forces up to ±100,000 g's and which is simple and inexpensive to manufacture. It is anticipated that the structure can be manufactured with little or no calibrating required so that manufacturing costs are at a minimum. Further, the accelerometer is accurate, extremely rugged, and not subject to external influences such as DC offset caused by bending, or pressure differentials.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. An accelerometer comprising:
    a substantially square diaphragm formed of monocrystaline silicon with opposed major surfaces and having four edges defined by a relatively thick frame member integrally affixed thereto;
    a serpentine resistor diffused into one of the major surfaces of said diaphragm adjacent each edge and centered approximately on a bisector of the edge with two resistors being oriented parallel to the adjacent edges and two resistors being oriented perpendicular to the adjacent edges; said resistors being electrically connected into a Wheatstone bridge configuration;
    a base member having a relatively flat surface, said frame member being positioned on the flat surface and fixedly attached thereto with said diaphragm being substantially parallel to the flat surface and spaced therefrom, said frame member fixedly anchoring each edge of said diaphragm to said base member to prevent relative movement thereof; and
    vent means formed in one of said frame member and said base member to prevent the occurrence of differential pressure on the opposed major surfaces of said diaphragm.

2. An accelerometer as claimed in claim 1 wherein the diaphragm is doped to make it an N type material.

3. An accelerometer as claimed in claim 2 wherein the serpentine resistors are formed by P type diffusion.

4. An accelerometer as claimed in claim 1 wherein the length of the edges of the diaphragm lie in a range of approximately 55 mils to 75 mils and the thickness lies in a range of approximately 0.8 mils to 1.2 mils.

5. An accelerometer as claimed in claim 1 wherein the frame member is fixedly attached to the base member by anodic bonding.

6. An accelerometer as claimed in claim 5 wherein the base member is formed of pyrex glass.

7. An accelerometer as claimed in claim 1 including in addition external electrical circuitry connected to the Wheatstone bridge for electrically balancing said bridge.

8. An accelerometer as claimed in claim 7 wherein the external electrical circuitry includes laser trimmable thin-film resistors formed on a semiconductor substrate and connected in parallel with resistors in at least two legs of the Wheatstone bridge.

9. An accelerometer as claimed in claim 1 wherein each of the serpentine resistors has a resistance value of approximately twenty thousand ohms.

10. An accelerometer as claimed in claim 1 wherein the accelerometer is constructed and dimensioned to withstand approximately ±100,000 g's.

* * * * *